United States Patent [19]
Balk et al.

[11] Patent Number: 5,733,944
[45] Date of Patent: Mar. 31, 1998

[54] AQUEOUS POLYMER DISPERSIONS

[75] Inventors: Roelof Balk, Böhl-Iggelheim; Peter Claassen, Ludwigshafen; Onno Graalmann, Dossenheim; Leonardus Aan de Meulen, Dudenhofen; Marinus Visseren, Zenenaar, all of Germany

[73] Assignee: BASF Aktiengesellschaft, Ludwigshafen, Germany

[21] Appl. No.: 651,633

[22] Filed: May 22, 1996

[30] Foreign Application Priority Data

May 26, 1995 [DE] Germany ............... 195 19 340.7
Dec. 22, 1995 [DE] Germany ............... 195 48 313.8

[51] Int. Cl.$^6$ ............... C08J 9/28; C08F 36/00; C08F 36/04
[52] U.S. Cl. ............... 521/65; 521/66; 521/148; 521/150
[58] Field of Search ............... 521/70, 71, 65, 521/89, 148, 150, 66; 524/219

[56] References Cited

U.S. PATENT DOCUMENTS

| | | |
|---|---|---|
| 1,852,447 | 4/1932 | Chapman et al. |
| 2,432,353 | 12/1947 | Talalay. |
| 3,542,700 | 11/1970 | Hilditch et al. |
| 3,719,614 | 3/1973 | Wright ............... 521/70 |
| 3,904,558 | 9/1975 | Graham et al. ............... 521/70 |
| 4,214,053 | 7/1980 | Porter ............... 521/70 |

FOREIGN PATENT DOCUMENTS

| | | |
|---|---|---|
| 0 407 059 | 1/1991 | European Pat. Off. |
| 0 377 808 | 3/1992 | European Pat. Off. |
| 1 940 385 | 2/1971 | Germany. |
| 326210 | 4/1930 | United Kingdom. |
| 1 095 973 | 12/1967 | United Kingdom. |
| 1 156 298 | 6/1969 | United Kingdom. |

OTHER PUBLICATIONS

Chemie, Physik und Technologie der Kunststoffe in Einzeldarstellungen, pp. 228–231, Hans Reinhard, "Dispersion Synthetischer Hochpolymerer".

Ullmanns Encyklopadie der Technischen Chemie, vol. 15, Verlag Chemie, Weinheim, 4th Edition, 1978, pp. 271–273.

*Primary Examiner*—Jeffrey T. Smith
*Attorney, Agent, or Firm*—Oblon, Spivak, McClelland, Maier & Neustadt, P.C.

[57] ABSTRACT

Aqueous polymer dispersions whose polymer is built up of a) at least 50% by weight of butadiene, isoprene or a mixture thereof, b) at least 10% by weight of an ester of (meth)acrylic acid and a $C_1$–$C_8$-alkanol and c) from 0 to 10% by weight of other comonomers, where the total amount of monomers a) and b) makes up at least 90% by weight of the total amount of monomers, are useful for producing flame-resistant latex foam rubber which contains only hydrates of inorganic salts as flame retardants.

9 Claims, No Drawings

AQUEOUS POLYMER DISPERSIONS

The present invention relates to aqueous polymer dispersions whose dispersed polymer is in free-radically polymerized form and is formed of a) at least 50% by weight of at least one monomer selected from the group consisting of butadiene and isoprene (monomers a), b) at least 10% by weight of at least one monomer selected from the group consisting of esters of acrylic acid or methacrylic acid and an alkanol having from 1 to 8 carbon atoms (monomers b) and c) from 0 to 10% by weight of other free-radically copolymerizable monomers containing at least one ethylenically unsaturated group (monomers c), with the proviso that the total amount of the monomers a) and b) which are polymerized in in free-radically polymerized form is at least 90% by weight, with the percentages by weight being based on the total amount of the monomers a)+b)+c) which are polymerized into the polymer.

The present invention also relates to a process for preparing such abovementioned aqueous polymer dispersions and also to their use for producing foam rubber and the foam rubber resulting from such use.

Aqueous polymer dispersions (latices) are generally known. They are fluid systems which contain polymer bundles consisting of a plurality of entangled polymer chains (so called polymer particles) dispersed in an aqueous dispersion medium. The diameter of the polymer particles is generally mainly in the range from 0.01 to 5 μm, frequently mainly in the range from 0.01 to 1 μm. The dispersed distribution of the polymer particles is generally not thermodynamically stable, ie. the system strives to reduce the interfacial area "dispersed polymer particles/aqueous dispersion medium" by a plurality of polymer particles combining to form larger polymer units (coagulum).

By means of dispersants (e.g. protective colloids and/or emulsifiers), the stability of the dispersed distribution of the polymer particles can frequently be maintained for a period of ≧1 month, often even for a period of ≧3 months or ≧6 months (cf. for example F. Hölscher, Dispersionen synthetischer Hochpolymerer, part I, Springer-Verlag, New York (1969)).

It is also generally known that foam rubber can be obtained from aqueous polymer dispersions by, for example, foaming the aqueous polymer dispersion by passing in gas, shaping the foam, partially coagulating the polymer particles in the foam in a controlled manner by targeted deactivation of the dispersants stabilizing the aqueous polymer dispersion, thereby gelling the foam, subsequently intermolecularly crosslinking the polymeric chains forming the polymer particles to generate elasticity and finally washing and drying the foam rubber thus produced (details may be found, for example, in Latex foam rubber, E. W. Madge, MacLaren & Sons Ltd., London, Interscience Publishers, J. Wiley & Sons, New York (1962) or in EP-A 377 808).

Of the synthetic aqueous polymer dispersions used for producing latex foam rubber (which, in contrast to polyurethane foam rubber, forms an open-pored foam, ie. the cells are in contact with one another), those whose dispersed polymer is built up of butadiene and styrene in free-radically polymerized form are by far the most important (cf. for example Reinhard, Dispersionen synthetischer Hochpolymerer, part II, Anwendung, Springer-Verlag, Berlin (1969), p. 230, lines 18/19).

This is attributable, in particular, to the fact that aqueous butadiene-styrene polymer dispersions are, on the one hand, obtainable in a simple manner by the method of free-radical aqueous emulsion polymerization and, on the other hand, the resulting polymers are easy to intermolecularly crosslink by vulcanization with sulfur, finally giving foam rubber having satisfactory physical properties. A substantial proportion of the consumption of butadiene/styrene foam rubber is used as upholstery material in the automobile and furniture industries. In addition, cushion fillings and mattresses are produced from such foam rubber. In this respect, the most important physical properties (based on 23° C. and 1 atm) of a foam rubber are its density by mass (it should be, determined in accordance with ISO 845, from 80 to 200 kg/m³), its elongation at break (it should be, determined in accordance with ISO 1798, ≧180%), its tensile strength (it should be, determined in accordance with ISO 1798, ≧70 kPa) and its indentation hardness (it should be, determined in accordance with ISO 2439, A, ≦350N).

However, a problem with butadiene-styrene foam rubber is, particularly in respect of the abovementioned uses, that it, like most plastics, is easily ignited if it contains no suitable additives.

Although numerous such additives, known as flame retardants, for plastics are known, these have to be compatible in terms of both their chemical nature and particularly the amount which needs to be used with the remaining property profile required of the plastics.

According to Ullmanns Encyklopädie der technischen Chemie, vol. 15, Verlag Chemie, Weinheim, 4th edition (1978) p. 271 ff, essentially three classes of flame-retardant additives suitable for plastics can be distinguished from one another:

a) halogenated organic compounds;

b) specific inorganic compounds;

c) phosphorus-containing organic compounds.

Compounds of the first class are increasingly undesired, since they can lead, in the case of fire, to the formation of toxicologically unacceptable haloorganic compounds (GB-1095973 and GB-1156298 describe, for example, the addition of homopolymers and/or copolymers of vinyl halides in the context of producing latex foam rubber having a reduced flammability). The last group includes, in particular, phosphonates, phosphites and phosphates such as tricresyl phosphate, which are disadvantageous insofar as they mostly have plasticizer character and therefore generally impair the desired physical properties of the foam rubber.

The inorganic compounds are essentially hydrates of inorganic salts such as zinc borate hydrate (e.g. $Zn(BO_2)_2 \cdot 2H_2O$ or $2 ZnO(B_2O_3)_3 \cdot (H_2O)_{3.5}$), metal oxide hydrates such as kaolins (e.g. $Al_2O_3 \cdot 2SiO_2 \cdot 2H_2O$), metal hydroxides such as $Al(OH)_3$ or mixed forms of the last two (metal oxide hydroxides). The metal hydroxides differ from metal oxide hydrates in that they contain the water in bonded form as OH groups. However, general language use frequently does not strictly differentiate between the two types, ie. metal hydroxides are frequently referred to as metal oxide hydrates and vice versa (thus, aluminum trihydroxide is frequently also referred to as aluminum oxide hydrate ($Al_2O_3 \cdot 3H_2O$) or as alumina hydrate). This uncertainty in the use of the two terms reflects the fact that the type of water bonding frequently cannot be determined.

The flame-retardant action of these compounds is based purely on the elimination of the water of hydration, which is why they, in contrast to the expanded mica of DE-A 1940385, have to be incorporated with retention of the water of hydration and when used alone usually have to be employed in amounts which cause undesired stiffening of the foam rubber. Other possible inorganic flame retardants are antimony trioxide and the equivalent arsenic compounds, but these usually display an efficient flame-retardant action only in the presence of halogen-containing organic additives, the flame-retardant action presumably being based on the formation of compounds such as antimony oxychlorides as active inhibitors. The toxic properties of antimony and arsenic are well known.

To give foam rubber based on aqueous butadiene-styrene polymer dispersions both the desired physical properties and at the same time a reduced flammability in accordance with standards (e.g. in accordance with DIN EN 597, parts 1 and 2, February 1992 version), simultaneous use is therefore always made in practice of a plurality of the abovementioned flame retardants so as to keep the disadvantages of the individual flame retardant as small as possible. However, this solution is not completely satisfactory. In this context, there have been recent reports in England that sudden infant death syndrome (SIDS) is associated with the treatment of baby mattresses with flame retardants (cf. for exmaple Karlsruher Kind, Gesundheit, issue 3, March 1995, page 9).

It is an object of the present invention to provide aqueous polymer dispersions which, in terms of availability and vulcanizability, are suitable for producing latex foam rubber in the same way as aqueous butadiene-styrene polymer dispersions but which, unlike aqueous butadiene-styrene polymer dispersions result in the latex foam rubber having a flame resistance in accordance with standards when only hydrates of inorganic salts are added as sole flame retardant, without the amount of inorganic salt hydrate to be used unacceptably impairing the required physical properties profile of the latex foam rubber.

We have found that this object is achieved by the aqueous polymer dispersions defined in the introduction.

The usability in principle of aqueous butadiene-comonomer polymer dispersions containing comonomers different from styrene for producing latex foam rubber is known from U.S. Pat. No. 3,542,700 and from EP-A 407 059.

Preferably, butadiene is the only monomer a), ie. the dispersed polymer of the aqueous polymer dispersions of the present invention is advantageously in free-radically polymerized form and formed of a) at least 50% by weight of butadiene (monomer a), b) at least 10% by weight of at least one monomer selected from the group consisting of esters of acrylic acid or methacrylic acid and an alkanol having from 1 to 8 carbon atoms (monomers b) and c) from 0 to 10% by weight of other free-radically copolymerizable monomers containing at least one ethylenically unsaturated group (monomers c), with the proviso that the total amount of the monomers a) and b) polymerized in in free-radically polymerized form is at least 90% by weight, with the percentages by weight in each case being based on the total amount of the monomers a)+b)+c) polymerized into the polymer.

The monomers b) are preferably selected from the group consisting of n-butyl acrylate, 2-ethylhexyl acrylate, methyl acrylate, ethyl acrylate, methyl methacrylate and isobutyl methacrylate. The proportion of the monomers b) is advantageously at least 20% by weight.

Particuarly preferably, methyl methacrylate is the only monomer b). As monomers c), preference is given to using only monoethylenically unsaturated monomers. Suitable monomers of this type are, for example, acrylic acid, methacrylic acid, acrylonitrile, methacrylonitrile, acrylamide, methacrylamide and styrene. The dispersed polymer of the aqueous polymer dispersion of the present invention advantageously contains at most 5% by weight of monomers c) in polymerized-in form. The monomers c) preferably contain neither halogen, nor phosphorus, nor arsenic, nor antimony nor a heavy metal. The dispersed polymer of the aqueous polymer dispersion of the present invention particularly advantageously contains no monomers c) in polymerized-in form, ie. useful aqueous polymer dispersions of the present invention are those whose dispersed polymer is in free-radically polymerized form and built up of from 50 to 90% by weight, preferably from 60 to 80% by weight, of monomers a) and from 10 to 50% by weight, preferably from 20 to 40% by weight, of monomers b).

Among these, particularly useful aqueous polymer dispersions are in turn those whose dispersed polymer is in free-radically polymerized form and is formed of from 50 to 90% by weight, preferably from 60 to 80% by weight, of butadiene and from 10 to 50% by weight, preferably from 20 to 40% by weight, of methyl methacrylate.

The aqueous polymer dispersions of the present invention can be prepared in a manner known per se by the method of free-radical aqueous emulsion polymerization, ie. the polymer is produced directly in the aqueous medium in dispersed form from the monomers containing at least one ethylenically unsaturated group in the presence of dispersants and free-radical polymerization initiators.

This method of polymerization has already been described many times and is therefore sufficiently well known to those skilled in the art (cf. for example Encyclopedia of Polymer Science and Engineering, Vol. 8 (1987), p. 659 ff; D.C. Blackly, in High Polymer Latices, Vol. 1 (1966), p. 35 ff; H. Warson, The Applications of Synthetic Resin Emulsions, chapter 5, page 246 ff (1972); D. Diederich, Chemie in unserer Zeit 24 (1990), pp. 135 to 142; Emulsion Polymerization, Interscience Publishers, New York (1965); DE-A 40 03 422 and Dispersionen synthetischer Hochpolymerer, part I, F. Hölscher, Springer Verlag, Berlin (1969)).

To ensure the stability of the resulting aqueous polymer dispersions of the present invention it is possible to use either the protective colloids customarily employed for carrying out free-radical aqueous emulsion polymerizations or emulsifiers.

Suitable protective colloids are, for example, polyvinyl alcohols, cellulose derivatives, copolymers containing vinylpyrrolidone or polycondensates of naphthalenesulfonic acid and formaldehyde whose number average, relative molecular weight based on atomic hydrogen is advantageously from 4000 to 8000. A comprehensive description of further suitable protective colloids may be found in Houben-Weyl, Methoden der organischen Chemie, Volume XIV/1, Makromolekulare Stoffe, Georg-Thieme-Verlag, Stuttgart, 1961, pp. 411 to 420. Of course it is also possible to use mixtures of emulsifiers and/or protective colloids. Since the monomers b) of the aqueous polymer dispersions of the present invention, unlike the monomers a), already have a significant solubility in the aqueous polymerization medium owing to their polarity, a combination of emulsifiers and protective colloids is preferably used when it is desired to produce aqueous polymer dispersions of the present invention whose dispersed polymer particles are chemically uniform. Aqueous polymer dispersions of the present invention having chemically uniform polymer particles are preferred. Polymer particles are said to be chemically uniform when the density by mass $\rho$ of all polymer particles is essentially the same, ie. when the densities by mass of at least 95% by weight of all polymer particles are within a range $\rho=\rho_0\pm2\%$.

As emulsifiers, which unlike the protective colloids are able, as surface-active substances, to form micelles, use is advantageously made of those whose relative molecular weights are, unlike the protective colloids, usually below 2000, preferably below 1000. They can be either anionic, cationic or nonionic in nature. Of course, if mixtures of surface-active substances are used, the individual components have to be compatible with one another, which in the case of doubt can be checked by means of a few preliminary experiments. In general, anionic emulsifiers are compatible with one another and with nonioinic emulsifiers. The same applies to cationic emulsifiers, while anionic and cationic emulsifiers are usually incompatible with one another. Customary emulsifiers are, for example, ethoxylated monoalkylphenols, dialkylphenols and trialkylphenols (degree of ethoxylation: from 3 to 100, alkyl radical: $C_4$–$C_{12}$), ethoxylated fatty alcohols (degree of ethoxylation: from 3 to 100, alkyl radical: $C_8$–$C_{18}$), and also alkali metal and ammonium salts of alkyl sulfates (alkyl radical: $C_8$–$C_{16}$), of sulfuric monoesters of ethoxylated alkanols (degree of ethoxylation: from 1 to 70, alkyl radical: $C_{12}$–$C_{18}$) and ethoxylated alkylphenols (degree of ethoxylation: from 3 to 100, alkyl radical: $C_4$–$C_{12}$), or alkylsulfonic acids (alkyl radical: $C_{12}$–$C_{18}$), of arylsulfonic acids and of alkylarylsulfonic acids (alkyl radical: $C_9$–$C_{18}$). Other suitable emulsifiers are the alkali metal and ammonium salts of alkyl sulfates (alkyl radical: $C_{10}$–$C_{18}$) and of aryl sulfates and alkylaryl sulfates (alkyl radical: $C_9$–$C_{18}$). Further suitable emulsifiers such as sulfosuccinic esters may be found in Houben-Weyl, Methoden der organischen Chemie, Volume XIV/1, Makromolekulare Stoffe, Georg-Thieme Verlag, Stuttgart, 1961, pages 192 to 208.

Since the fundamental principle of the two most important processes for producing latex foam rubber, the Dunlop process and the Talalay process, comprises gelling a foamed aqueous polymer dispersion which is stable at a pH >7 by lowering the pH, the alkali metal (in particular sodium and potassium) and ammonium salts of $C_8$–$C_{18}$-fatty acids (saturated and unsaturated) and of disproportionated resin acids from rosin are particularly preferred emulsifiers for stabilizing the aqueous polymer dispersions of the present invention. Among these, the potassium, sodium and ammonium salts of palmitic acid, oleic acid, stearic acid, linoleic acid and linolenic acid are particularly preferred. Anionic stabilization is generally preferred.

In general, the aqueous polymer dispersions of the present invention contain, based on the amount of dispersed polymer, from 0.5 to 10% by weight, preferably from 1 to 5% by weight, of dispersant. The total amount of dispersant in the aqueous polymer dispersions of the present invention advantageously comprises at least 50% by weight and particularly preferably at least 75% by weight of alkali metal and/or ammonium salts of $C_8$–$C_{18}$-fatty acids. The total amount of dispersant in the aqueous polymer dispersions of the present invention very particularly advantageously comprises at least 50% by weight and particularly preferably at least 75% by weight of alkali metal and/or ammonium salt of oleic acid. The dispersant in the aqueous polymer dispersions of the present invention is particularly usefully a combination of at least one protective colloid and at least one of the abovementioned salts of a $C_8$–$C_{18}$-fatty acid.

Suitable free-radical polymerization initiators for the free-radical aqueous emulsion polymerization for preparing the aqueous polymer dispersions of the present invention are in principle all those which are able to trigger a free-radical aqueous emulsion polymerization. These can be either peroxides or azo compounds. Particularly suitable peroxides are hydrogen peroxide, tert-butyl hydroperoxide, diisopropylbenzene hydroperoxide, para-menthane hydroperoxide, cumene hydroperoxide and peroxodisulfuric acid and salts thereof. Preference is given to using combination systems comprising at least one reducing agent and at least one peroxide and/or hydroperoxide, since the reducing agents activate the formation of free radicals and thus make it possible to carry out the free-radical aqueous emulsion polymerization at relatively low temperatures.

Suitable reducing agents are, for example, ascorbic acid, acetone bisulfite, the sodium salt of hydroxymethanesulfinic acid, sodium sulfite, sodium hydrogen sulfite or sodium dithionite. Very particularly preferably, the abovementioned combination (redox initiator) systems additionally contain a small amount of a metal compound which is soluble in the polymerization medium and whose metallic component can occur in a plurality of oxidation states. An example of such metal compounds are iron(II) salts such as iron(II) sulfate. In place of a water-soluble iron(II) salt, use is frequently also made of a combination of water-soluble Fe/V salts. Such redox initiator systems containing a metal compound of this type are of advantage insofar as they make it possible to carry out the free-radical aqueous emulsion polymerization at even lower temperatures. Examples of such redox initiator systems are ascorbic acid/iron(II) sulfate/hydrogen peroxide or sodium dithionite+sodium formaldehyde sulfoxylate/iron (II) sulfate/para-menthane hydroperoxide or diisopropylbenzene hydroperoxide. A small amount of a chelating agent is frequently additionally added to such redox initiator systems containing a metal compound so as to ensure that the metallic component is present in solution and is not removed from the reaction system, for example by a precipitation reaction. An example which may be mentioned of such a chelating agent is the sodium salt of ethylenediaminetetraacetic acid. The metallic component is frequently added directly as a chelate complex.

Based on the monomers to be polymerized, the amount of initiator used is generally from 0.01 to 5% by weight.

The polymerization temperature T is advantageously such that $-10°<T<70°$ C. since butadiene contains two ethylenically unsaturated groups, particularly three-dimensional crosslinking reactions (chemical bonding between at least two different polymer chains) can occur even during the course of the free-radical aqueous emulsion polymerization. High polymerization temperatures promote such three-dimensional crosslinking reactions. According to the present invention, preference is given to those aqueous polymer dispersions of the present invention whose dispersed polymer consists predominantly of non-crosslinked long polymer chains which have at most a low degree of branching. Such a low degree of crosslinking is reflected in the physical properties of the films formed from the aqueous polymer dispersions.

A further measure for characterizing the polymer is its "insoluble fraction". To determine the insoluble fraction, the emulsion polymer is isolated in a manner known per se by coagulation (e.g. lowering of the pH and addition of isopropanol).

Subsequently, 0.3 g of the coagulumis added at 25° C. and 1 atm to 100 ml of toluene and the mixture is stirred for 20 hours. The undissolved material is then filtered off and its weight is divided by the amount of polymer weighed out. Expressed in % by weight, this gives the "insoluble fraction". According to the present invention, the insoluble fraction is preferably from 60 to 70% by weight.

A physical property of the films formed from the aqueous polymer dispersions of the present invention which is of particular significance in the above respect is the maximum value of tan δ, known as tan $δ_{max}$, resulting from a temperature-dependent dynamic mechanical analysis at from −15° to +175° C. Tan $δ_{max}$ is measured using a MkII DMTA instrument from Polymer Laboratories (Loughborough, England) in the shear mode at a frequency of 1 Hz and a heating rate of 4° C./min (formation of the film is here carried out at above the minimum film formation temperature (frequently at 25° C.) and at 1 atm pressure; the film is subsequently dried in a desiccator for from 10 to 30 hours at 25° C. under reduced pressure over desiccants; after drying is complete, the DMTA measurement is carried out; the film thickness is normally 0.5 mm, the film specimen used is normally a disk having a diameter of 11 mm; the film has to be free of bubbles). According to the present invention, tan $δ_{max}$ is preferably from ≧0.2 to ≦0.5, particularly preferably from ≧0.25 to ≦0.35. The parameter tan δ here is the ratio of "loss modulus/elastic modulus"=E"/E'.

This means that particularly advantageous aqueous polymer dispersions of the present invention are those whose dispersed polymer has an insoluble fraction of from 60 to 70% by weight and whose films at the same time have a tan $δ_{max}$ of from ≧0.2 to ≦0.5 or ≧0.25 to ≦0.35.

Correspondingly, the polymerization temperature is advantageously from −10° to 50° C, preferably from −10° to 30° C., particularly preferably from 0° to 20° C. and very particularly preferably from 10° to 20° C.

A further measure for restricting the degree of crosslinking is the addition of molecular weight regulators (chain transfer agents) such as mercaptans (alkanethiols) which advantageously have from 3 to 15 carbon atoms. According to the present invention, tert-dodecyl mercaptan or n-dodecyl mercaptan is preferably used as molecular weight regulator. Typically, the substances which regulate the moleuclar weight are used in amounts of from 0.01 to 3% by weight, based on the total amount of monomers to be polymerized. The working pressure in the free-radical aqueous emulsion polymerization is usually from 1 to 15 atm, preferably from 1 to 6 atm and particularly preferably from 1 to 3 atm.

Preferably, latex foam rubber is produced from aqueous polymer dispersions of the present invention whose proportion by volume of polymer (the volume of polymer divided by the total volume of the aqueous polymer dispersion) is ≧50% by volume, preferably from 60 to 70% by volume, since the gelation occurs particularly easily in the case of latex foams produced from such aqueous polymer dispersions (cf. Plaste und Kautschuk, Volume 24, 1977, No. 5, p. 346). However, a disadvantage of such concentrated aqueous polymer dispersions is, for example, their increased flow resistance. On the other hand, coarse aqueous polymer disperisons have a lower flow resistance than do fine aqueous polymer dispersions having the same Solids content. Furthermore, the flow resistance of such aqueous polymer dispersions whose polymer particle diameter distribution has more than one maximum (polymodal aqueous polymer dispersion) is generally less than that of monomodal aqueous polymer dispersions.

According to the present invention, preference is therefore given to those aqueous polymer dispersions whose proportion by volume of polymer is from 50 to 70% by volume (percentages by volume in this document are based on 25° C. and 1 atm) and whose weight average polymer particle diameter is ≧300 nm, preferably from 350 to 550 nm. Furthermore, the frequency distribution of the polymer particle diameters at the same time preferably has two maxima, ie. it is advantageously bimodal. The position of the first maximum is preferably in the diameter range from 50 to 100 nm, while the position of the second maximum is preferably in the range from 400 to 800 nm and very particularly preferably in the range from 450 to 650 nm. Furthermore, it is useful if the width at half height of the first maximum is from 20 to 100 nm, preferably from 30 to 50 nm, and the width at half height of the second maximum is above 500 nm, preferably at from 500 to 1500 nm, particularly preferably at from 800 to 1200 nm, and if the two maxima each comprise 40–60% by weight of the polymer particles. The aqueous polymer dispersion of the present invention generally contains no polymer particles having a diameter above 2500 nm. It is also useful if the ratio of weight average to number average polymer particle diameter is from 1.5 to 2.5.

Owing to the low reactivity of butadiene, the aqueous polymer dispersions described here are advantageously not prepared directly by free-radical aqueous emulsion polymerization.

Rather, the free-radical aqueous emulsion polymerization is first used to produce a fine, generally monomodal, aqueous starting polymer dispersion whose weight average particle diameter is from 50 to 80 nm and whose proportion by volume of polymer is from 15 to 45% by volume, preferably from 25 to 45% by volume.

This fine aqueous starting polymer dispersion is subsequently subjected in a manner known per se to an irreversible particle enlargement by means of agglomeration processes. Possible agglomeration processes which can be used in a known manner are, for example, freeze agglomeration, pressure agglomeration or chemical agglomeration. This is followed by the aqueous polymer dispersion being concentrated to the desired concentration by volume of polymer. Suitable processes for concentrating latices are those known per se, for example evaporation, gravity separation, centrifugation or electrodecantation.

The free-radical aqueous emulsion polymerization for preparing the aqueous starting polymer dispersion of the present invention is advantageously carried out by charging the polymerization vessel with the total amount of the polymerization batch (including the molecular weight regulator) except for the free-radical initiator, heating the mixture to the polymerization temperature and subsequently adding, generally all at once, free-radical initiators to the polymerization vessel and carrying out the polymerization. The polymerization temperature can here be kept constant, but the polymerization temperature is preferably from 5° to 10° C. up to the attainment of a polymerization conversion of from 40 to 50% by weight, based on the total amount of the monomers to be polymerized. Subsequently, the polymerization temperature is advantageously from >10° to 15° C. up to the attainment of a polymerization conversion of 60% by weight and is then preferably increased to from >15° to 20° C. and left at this temperature until the final polymerization conversion has been attained. In the process of the present invention, the latter is generally >60% by weight, desirably >80% by weight, advantageously >85% by weight, preferably >90% by weight, particularly preferably >95% by weight and very particularly preferably >98% by weight, based on the monomers to be polymerized. The free-radical aqueous emulsion polymerization is subsequently stopped by addition of polymerization inhibitors such as diethylhydroxylamine and unreacted monomers are removed in a manner known per se by deodorization (preferably stripping and/or steam distillation). During the polymerization, it is of course possible to add further free-radical initiators and/or dispersants for the purpose of attaining the desired polymerization conversion and for the purpose of additionally stabilizing the aqueous polymer dispersion. Furthermore, buffers such as alkali metal phosphate can be added during the emulsion polymerization to stabilize the pH of the aqueous dispersion medium. Adding small amounts of strong electrolytes such as potassium sulfate, potassium chloride and/or sodium sulfate makes it easier, in a manner known per se, to set the desired polymer particle diameters. In addition, the polymer particle diameter is determined mainly by the amount of dispersant used. In general, increasing amount of dispersant is accompanied by decreasing polymer particle diameters.

In summary, the preparation of the aqueous polymer dispersions of the present invention is essentially carried out in a corresponding manner to the preparation of aqueous butadiene-styrene polymer dispersions, ie. the free-radical aqueous emulsion polymerization of the present invention can be carried out as a batch process, by the feed stream process or continuously in a cascade process.

The same applies to the production of latex foam rubber from the aqueous polymer dispersions of the present invention, ie. the two most important processes for foam rubber production, namely the Dunlop process and the Talalay process, can be used. The fundamental principle of both these processes is that a latex foam produced at a pH of >7 is gelled by lowering the pH and is thereby fixed. Following the gelation, the crosslinking to produce the required elasticity is advantageously carried out by means of finely divided sulfur (vulcanization). It should advantageously have a purity of at least 95% by weight (ash content: <0.5% by weight). In addition, the sulfur should be largely free of acid, because acids exercise a retarding influence on the vulcanization. Flowers of sulfur, which usually contains traces of $SO_2$, is therefore less preferred. Advantageously, sulfur having an intermediate fineness (from 70 to 80 chancel grade) is used. Its uniform distribution in the latex foam is essential for a good property profile of the latex foam rubber. Use is therefore frequently made of the sulfur in the form of a dispersion which has been dispersed in an aqueous medium by means of dispersants and usually has a sulfur content of from 40 to 60% by weight. Aqueous sulfur pastes are also useful for this purpose. The amount of sulfur added is generally from 0.05 to 3% by weight, preferably from 0.1 to 2% by weight, based on the amount of butadiene polymerized into the latex foam.

Owing to the low reactivity of the sulfur and the second olefinically unsaturated group of the butadiene polymerized into the latex foam, the sulfur is normally used together with vulcanization accelerators and activators.

The most important accelerators are thiazoles (also known as mercapto accelerators) such as 2-mercaptobenzothiazole, its zinc salt and dibenzothiazyl disulfide, sullenamides such as benzothiazyl-2-cyclohexylsulfenamide, benzothiazyl-2-tert-butylsulfenamide, benzothiazyl-2-sulfenemorpholide and benzothiazyldicyclohexylsulfenamide, guanidines such as diphenylguanidine, di-ortho-tolylguanidine and ortho-tolylbiguanidine, thiurams such as tetramethylthiuram disulfide and tetraethylthiuram disulfide, dithiocarbamates such as zinc N-dimethyldithiocarbamate, zinc N-diethyldithiocarbamate, zinc N-dibutyldithiocarbamate, zinc N-ethylphenyldithiocarbamate and zinc N-pentamethylenedithiocarbamate, thioureas such as ethylenethiourea, diethylenethiourea and diphenylthiourea and also aldehyde-amine condensation products such as those derived from butyraldehyde and aniline. Mixtures of vulcanization accelerators are frequently also used. From 0.05 to 4% by weight of vulcanization accelerators is normally used, based on the amount of butadiene polymerized into the latex foam.

To display their optimum activity, most vulcanization accelerators require activators such as zinc oxide (primary activator). The latter can in turn be activated by addition of fatty acids or their salts (secondary activators). The amount of ZnO used is advantageously from 0.5 to 5% by weight, based on the amount of butadiene polymerized into the latex foam. Fatty acids and their salts such as potassium oleate and the potassium salts of rosin acids simultaneously act as foam stabilizers. The vulcanization temperature used is normally from 80° to 150° C.

The unsaturated groups still present in the aqueous polymer dispersion of the present invention, which on the one hand make the vulcanization possible by means of their reactivity with sulfur, on the other hand make the resulting latex foam rubber sensitive to reactive substances such as oxygen. As a consequence of this interaction, the latex foam rubber can become hard and brittle (aging). For this reason, aging inhibitors such as Wingstay® L are often added to the latex foam.

To make possible a very homogeneous distribution of the abovementioned auxiliaries, they too are preferably added as an aqueous dispersion having a strength of from 40 to 60% by weight or as an aquoeus paste.

In addition, according to the present invention, a hydrate of an inorganic salt may be added to make the resulting latex foam rubber flame resistant. Preference is here given to using metal oxide hydrates, metal hydroxides and their mixed forms (metal oxide hydroxides). Such hydrates of an inorganic salt are advantageously free of halogen, phosphorus, arsenic and antimony. Examples of suitable hydrates of this type are kaolins, zinc borate hydrates, aluminum oxide trihydrate and aluminum trihydroxide (e.g. hydrargillite, gibbsite, bayerite or nordstrandite).

Further hydrates of inorganic salts may be found in Angew. Chem., Volume 173, 1961, No. 24, pp. 785 to 805. Preference is given to adding those hydrates of inorganic salts which are dehydrated at atmospheric pressure at 200° C. or above, preferably in the range from 200° to 500° C. Preference is given to using those hydrates of an inorganic salt which are free of heavy metals, for example aluminum oxide trihydrate ($Al_2O_3.3H_2O$) or $Al(OH)_3$.

Of course, the hydrates of the inorganic salts are preferably incorporated in finely divided form. The number average long diameter of their particles is generally from 0.1 to 500 μm. Appropriately fine aluminum trihydroxides are commercially available, for example, as Martinals® from Martinswerk GmbH in Bergheim (Germany). Examples are Martinal ON, Martinal OX, Martinal ON-313 and Martinal OL-104. Particularly useful is Martinal ON-313 whose number average longest diameter is from 10 to 50 μm (cf. "Martinal als flammhemmender Füllstoff in Kunstharzbeton und Kunstmarmor, September 1983, Kz: 7/1", Martinswerk GmbH, Bergheim (Germany)).

Further suitable finely divided aluminum trihydroxides are the Apyrals® (cf. "Apyral as a Flame Retardant", VAW, 1988) from Vereinigte Aluminium Werke AG, Schwandorf, Germany. Examples are Apyral 60, Apyral 25, Apyral 30, Apyral 2 and Apyral 1. The action of the finely divided hydrates of inorganic salts to be added according to the present invention on the physicomechanical properties of the latex foam rubber of the present invention corresponds essentially to that of fillers.

Latex foam rubber normally contains at most 30%, in general even only 20%, of its weight of fillers, so as not to impair its physical properties.(cf. for example Dispersionen synthetischer Hochpolymerer, part II, H. Reinhard, Springer-Verlag, Berlin (1969), p. 229, second last section).

It is therefore surprising that according to the invention from 35 to 55% by weight, preferably from 40 to 50% by weight, based on the polymer of the present invention, of finely divided hydrate of an inorganic salt can be added while keeping the mechanical property profile of the latex foam rubber within the required range (density by meass in accordance with ISO 845: 80–200 kg/m³, elongation at break in accordance with ISO 1798: ≧180%, tensile strength in accordance with ISO 1798: ≧70 kPa, and indentation hardness in accordance with ISO 2439, A: ≦350N, each at 23° C. and 1 atm). It is also surprising that such an addition of only a finely divided hydrate of an inorganic salt (ie. without addition of further flame retardants) enables a flame resistance in accordance with standards to be achieved in the foam rubber of the present invention. If $Al_2O_3.3H_2O$ or $Al(OH)_3$ is used as such a finely divided hydrate of an inorganic salt, it is, in particular, possible to obtain for the first time a latex foam rubber which is free of halogen, free of phosphorus and free of heavy metals (all metals whose atomic weight is above that of Ca, with the exception of Zn) and has, on the one hand, a flame resistance in accordance with standards and, on the other hand, is fully satisfactory in respect of its physicomechanical properties. Apart from the finely divided hydrates of an inorganic salt to be added according to the present invention, the latex foam rubbers of the present invention can additionally contain up to 20% by weight, based on the polymer of the present invention, of other finely divided fillers which are customary per se, for example chalk.

Specifically, the production of latex foam rubber starting from the aqueous polymer dispersion of the present invention is usually completed in a plurality of process steps.

Normally, the chemicals required for vulcanization (colloidal sulfur and vulcanization accelerators), antioxidants, foam stabilizers and if desired further auxiliaries are first mixed with the aqueous polymer dispersion of the present invention. Generally after a certain maturing period which can be up to 3 days, with or without gentle stirring of the mixture, the prepared aqueous polymer dispersion is brought to the desired degree of foaming (generally from 8 to 12 times the volume of the starting mixture). This can be achieved, for example, by addition of compounds which evolve gases (hydrogen peroxide, sodium perborate or low-boiling solvents). However, it is advantageously carried out in a simple manner by beating in air by means of a mechanical blowing machine. Normally, any inorganic fillers to be used and the finely divided hydrates of inorganic salts to be added according to the present invention are added beforehand or at the same time.

As the actual characterizing feature of the Dunlop process (e.g. GB-326210 and U.S. Pat. No. 1,852,447), the gelling agent, preferably finely divided sodium and/or potassium hexafluorosilicate, is added to the finished latex foam. The action of the hexafluorosilicates is based on the slow hydrolysis in accordance with

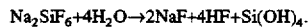

$Na_2SiF_6 + 4H_2O \rightarrow 2NaF + 4HF + Si(OH)_4$.

This means that the gelation occurs at the cost of hydrogen fluoride formation which lowers the pH of the foam. In addition, the silicic acid formed adsorbs the dispersants on its large surface area and thus additionally reduces the stability of the latex foam. The gelling agent is advantageously incorporated into the foam within a few minutes. Subsequently, in the Dunlop process, the latex foam is placed, for example, in a metal mold. Typically, gelation occurs in the mold by leaving the latex foam under ambient conditions or at elevated temperature. The vulcanization can be carried out subsequent to gelation, for example by means of the action of superheated steam. Of course, gelation and vulcanization can also overlap. The still hot foam rubber is then generally taken from the mold, washed and dried.

Notably, when using the aqueous polymer dispersions to be used according to the present invention for producing latex foam rubber, (both in the Dunlop process and in the Talalay process), the flame resistance of the resulting latex foam rubber is influenced not only by the addition of a hydrate of an inorganic salt but also by the gelation time selected.

As a rule of thumb, slower gelling improves the resulting flame resistance which becomes noticeable, in particular, for small additions of hydrates of inorganic salts (in particular, a better result is obtained in the test in accordance with DIN EN 597, part 1, with and without textile support (normally flame retardant polyester)).

According to the present invention, gelation times of from ≧10 min to ≦1 h, preferably ≦30 min, are recommended in the Dunlop process. This applies particularly when using aqueous polymer dispersion A as described in the examples. In this case, gelation times of less than 10 minutes are less advisable.

Possible ways of influencing the gelation time are:

a) the amount of gelling agent used; the gelation time normally decreases with an increasing amount of gelling agent used;

b) the amount of dispersant used for stabilizing the aqueous starting polymer dispersion (in particular the amount of alkali metal and/or ammonium salts of $C_8$–$C_{18}$-fatty acids); the gelation time normally increases with an increasing amount of dispersant;

c) the temperature prevailing during gelation; an elevated temperature generally causes accelerated gelation, particularly when using $Na_2SiF_6$ as gelling agent.

The Talalay process (cf. for example U.S. Pat. No. 2,432,353) is distinguished from the Dunlop process essentially by the way in which the gelation is carried out. Normally, a mold is partially filled with the latex foam not yet containing any added gelling agent. Application of a vacuum causes the prefoamed composition to expand further until it completely fills the mold. The foam is then frozen by cooling the mold, typically to about −30° C. The vacuum is subsequently released by passing in $CO_2$, accompanied by thawing of the system. At the same time the acid $CO_2$ effects the gelation. The foam is then vulcanized in a manner known per se.

While the Dunlop process is used for producing foam rubber predominantly in the form of sheets and blocks (e.g. mattresses), the Talalay process is used for producing predominantly foam rubber blocks. Both process methods are sufficiently well known to those skilled in the art on the basis of butadiene-styrene latex foam rubber production.

The process of the present invention is particularly advantageously used for producing foam rubber cushions and foam rubber mattresses and also upholstery material in the automobile and furniture industries. Of course, the latex foam rubber of the present invention is also suitable for carpet backing.

The present invention accordingly provides, in particular, latex foam rubber i) which contains no (<2% by weight based on the foam rubber) phosphorus-containing organic compound (in the limiting case, no phosphorus at all), no halogenated organic compound (in the limiting case, no halide at all), no As and no Sb, ii) whose polymer is in free-radically polymerized form and is built up of
   a) at least 50% by weight of at least one monomer selected from the group consisting of butadiene and isoprene (monomers a),
   b) at least 10% by weight of at least one monomer selected from the group consisting of esters of acrylic acid or methacrylic acid and an alkanol having from 1 to 8 carbon atoms (monomers b) and
   c) from 0 to 10% by weight of other free-radically copolymerizable monomers containing at least one ethylenically unsaturated group (monomers c),
   with the proviso that the total amount of the monomers a) and b) which are polymerized in in free-radically polymerized form is at least 90% by weight, with the percentages by weight being based on the total amount of the monomers a)+b)+c) which are polymerized into the polymer,
iii) which contains from 35 to 55% by weight of a finely divided hydrate of an inorganic salt, based on the mass of the abovementioned polymer, and
iiii) which has, at 1 atm and 23° C., the following physical properties
   density by mass: 80–200 kg/m$^3$,
   elongation at break in accordance with ISO 1798: $\geq$180%,
   tensile strength in accordance with ISO 1798: $\geq$70 kPa and
   indentation hardness in accordance with ISO 2439, A: $\leq$350N.

Latex foam rubber made in this way surprisingly has a reduced flammability in accordance with DIN EN 597, parts 1 and 2, February 1992 version, and also a reduced tendency to develop smoke.

It is particularly advantageous according to the present invention that the abovementioned latex foam rubber can also be obtained free (<1% by weight based on the foam rubber) of heavy metals.

EXAMPLES a) Preparation of an aqueous polymer dispersion A according to the present invention A stirred polymerization pressure vessel having an internal volume of 160 l was charged at 20° C. with a solution of 0.18 kg of K$_2$SO$_4$, 0.11 kg of Na$_2$SO$_4$, 0.007 kg of the Na salt of ethylenediaminetetraacetic acid, 0.007 kg of sodium dithionite, 0.17 kg of a polycondensate of naphthalenesulfonic acid and formaldehyde having a number average molecular weight of 5000 in the form of a 45% strength by weight aqueous solution, 7.9 kg of potassium oleate in the form of a 12.5% strength by weight aqueous solution and 9.0 kg of water, and, subsequently, 46.8 kg of water were added.

The following constituents of a redox initiator system were then added:
0.007 kg of sodium dithionite, 0.007 kg of sodium formaldehyde sulfoxylate, 0.003 kg of Fe(II)SO$_4$.7H$_2$O, 0.007 kg of the Na salt of ethylenediaminetetraacetic acid, 0.013 kg of sodium phosphate (Na$_3$PO$_4$.10H$_2$O) and 2.5 kg of water.

11.5 kg of methyl methacrylate and 0.03 kg of tert-dodecyl mercaptan were then stirred in. Finally, 21.4 kg of butadiene were injected into the polymerization vessel.

The resulting mixture was cooled to 10° C. 0.05 kg of para-menthane hydroperoxide were then added at once and the polymerization was thereby triggered. While maintaining the polymerization temperature at 10° C., the polymerization was continued to a polymerization conversion of 35% by weight, based on the total amount of the monomers to be polymerized. Then, another 1.3 kg of potassium oleate (as a 12.5% strength by weight aqueous solution) was added at once and 0.02 kg of para-menthane hydroperoxide was added at once. The polymerization was then continued to a polymerization conversion of 50% by weight while maintaining the temperature at 10° C. The polymerization temperature was then increased to 15° C. and polymerization was continued at this temperature to a conversion of 60% by weight. Subsequently, the polymerization temperature was increased to 20° C. and the polymerization was continued while maintaining this temperature to a polymerization conversion of >98% by weight and $\leq$99% by weight. Finally, the free-radical aqueous emulsion polymerization was stopped by addition of 0.012 kg of diethylhydroxylamine. Subsequent thereto, the mixture was further stabilized by addition of 1.7 kg of potassium oleate (as a 12.5% strength by weight aqueous solution). Finally, the residual monomers were removed by stripping with steam.

This gave an aqueous polymer dispersion which had a solids content of 33% by weight. Investigations by means of an analytical ultracentrifuge showed the dispersed polymer particles to be chemically uniform. The particle density determined corresponds to a polymer composition of 65% by weight of butadiene and 35% by weight of methyl methacrylate. The weight average particle diameter of the monomodal aqueous polymer dispersion was 70 nm.

The aqueous starting polymer dispersion thus obtained was subjected at 20° C. to pressure agglomeration (apparatus: homogenizer from APr Gaulin, model MC 45-5TBAX, pressure: 320 bar).

The pressure-agglomerated aqueous polymer dispersion was concentrated by means of a thin-film evaporator to a polymer concentration of 60% by volume (the wall temperature of the thin-film evaporator varied from 100° to 130° C.). The pressure in the evaporator varied from 80 to 120 mbar. The associated latex temperature was from 40° to 50° C.

The particle diameter distribution function (frequency distribution) of the resulting aqueous polymer dispersion A according to the present invention had two maxima. The first maximum was at a diameter of 70 nm, the second was at a diameter of 580 nm. The width at half height of the first maximum was 40 nm and the width at half height of the second maximum was 1000 nm. The weight average polymer particle diameter was 148 nm and the number average diameter was 76 nm.

The parameter tan $\delta_{max}$ was determined as 0.3 and the undissolved fraction of the dispersed polymer was 65% by weight. At this point, it may be stated that in place of the pressure agglomeration it is also possible to use, for example, a chemical agglomeration as follows: 9 kg of the aqueous starting dispersion to be agglomerated are heated to 50° C. 0.002 kg of a modified polyethylene glycol (Carbowax® 20M) and 0.05 kg of a polycondensate of naphthalenesulfonic acid and formaldehyde (number average molecular weight=5000) are added (appropriate amounts of a 10% strength by weight aqueous Carbowax solution and a 45% strength by weight aqueous polycondensate solution are mixed to form an aqueous solution having a total strength of 25% by weight, which is then added). The resulting mixture is stirred for 30 minutes at 50° C. and subsequently cooled to 25° C. During cooling, 0.26 kg of potassium oleate is added as a 12.5% strength by weight aqueous solution.

b) Preparation of an aqueous butadiene-styrene comparative dispersion B

The preparation of the aqueous comparative dispersion B was carried out in a similar way to a), with a comparable degree of crosslinking being set. The essential process difference was that an equimolar amount of styrene was used in place of methyl methacrylate correspondingly, the use of the naphthalene-formaldehyde protective colloid was able to be omitted. In place of this, the initial charge contained 3.8 kg of potassium oleate and the amount of potassium oleate added at a polymerization conversion of 35% by weight was 0.75 kg.

c) Production of latex foam rubber from the aqueous polymer dispersions A and B 1240 g in each case of the aqueous polymer dispersion having a polymer concentration of 60% by volume was treated in succession with:

64 g of potassium oleate as a 12.5% strength by weight aqueous solution, 16 g of the potassium salt of disproportionated rosin acids as a 25% strength by weight aqueous solution, 0 g or 320 g of Al(OH)$_3$ (Martinal ON 313=ATH), 28 g of sulfur as a 50% strength by weight aqueous suspension, 16 g of zinc ethylphenyldithiocarbamate as a 50% strength by weight aqueous suspension and 12 g of diphenylguanidine as a 50% strength by weight aqueous suspension, 16 g of Wingstay L as a 50% strength by weight aqueous suspension and 48 g of finely divided ZnO as a 50% strength by weight aqueous suspension.

The resulting mixture was foamed to from 8 to 10 times its volume by means of a mechanical blowing machine. 112 g of Na$_2$SiF$_6$ (as a 25% strength by weight aqueous suspension) were incorporated into the resulting foam over a period of 2 minutes.

The mechanically foamed composition was subsequently placed in a metal mold (450 mm×350 mm×50 mm) and the excess foam was struck off flat. After gelation had occurred by means of leaving for 10 minutes at room temperature, vulcanization was carried out in a vulcanization oven heated by means of steam at 100° C. (30 minutes). The resulting foam rubber was then taken from the mold, washed and dried and conditioned in accordance with DIN EN 597 (February 1992 version, parts 1 and 2).

Subsequently, the flammability of the foam rubber obtained in each case was examined in accordance with DIN EN 597 parts 1 and 2, and its physicomechanical properties were determined (23° C., 1 atm). The results obtained are shown in the following table.

TABLE

| | Density by mass in accordance with ISO 845 (kg/m$^3$) | Tensile strength in accordance with ISO 1798 (kPa) | Elongation at break in accordance with ISO 1798 (%) | Indentation hardness in accordance with ISO 2439 A (40% indentation, N) | Flammability Part 1 | Part 2 |
|---|---|---|---|---|---|---|
| Latex A (without ATH) | 100 | 80 | 240 | 270 | yes | yes |
| Latex A (with ATH) | 140 | 95 | 230 | 300 | no | no |
| Latex B (without ATH) | 100 | 100 | 230 | 280 | yes | yes |
| Latex B (with ATH) | 135 | 100 | 200 | 340 | yes | yes |

The compressive set in accordance with ISO 1856 was in all cases from 5 to 10%. When using the latex B, the amount of ATH added had to be increased to 800 g to avoid flammability in accordance with DIN EN 597, parts 1 and 2. Under these conditions, the physicomechanical properties of the resulting foam rubber were:
170 kg/m$^3$    50 kPa    150%    480 N
The compressive set was 8%. Owing to its physicomechanical nature, such a latex foam rubber is, for example, no longer suitable for producing a mattress.

We claim:

1. A latex foam rubber obtained by applying the Dunlop or Talalay process to an aqueous polymer dispersion said aqueous polymer dispersion being in free-radically polymerized form and said aqueous polymer dispersion comprising a dispersed polymer comprising:
   (a) at least 50% by weight of at least one monomer selected from the group consisting of butadiene and isoprene (monomers a),
   (b) at least 10% by weight of at least one monomer selected from the group consisting of an ester of acrylic acid or methacrylic acid and an alkanol having from 1 to 8 carbon atoms (monomers b) and
   (c) from 0 to 10% by weight of another free-radically copolymerizable monomer containing at least one ethylenically unsaturated group (monomers c),
with the proviso that the total amount of the monomers a) and b) which are polymerized in in free-radically polymerized form is at least 90% by weight, with the percentages by weight being based on the total amount of the monomers a)+b)+c) which are polymerized into the polymer.

2. A latex foam rubber whose polymer is in free-radically polymerized form and said polymer is formed of
   (a) at least 50% by weight of at least one monomer selected from the group consisting of butadiene and isoprene (monomers a),
   (b) at least 10% by weight of at least one monomer selected from the group consisting of an esters of acrylic acid or methacrylic acid and an alkanol having from 1 to 8 carbon atoms (monomers b) and
   (c) from 0 to 10% by weight of another free-radically copolymerizable monomer containing at least one ethylenically unsaturated group (monomers c), with the proviso that the total amount of the monomers a) and b) which are polymerized in free-radically polymerized form is at least 90% by weight, with the percentages by weight being based on the total amount of the monomers a)+b)+c) which are polymerized into the polymer.

3. A latex foam rubber whose polymer is in free-radically polymerized form and said polymer is formed of
   (a) at least 50% by weight of at least one monomer selected from the group consisting of butadiene and isoprene (monomers a),
   (b) at least 10% by weight of at least one monomer selected from the group consisting of an esters of acrylic acid or methacrylic acid and an alkanol having from 1 to 8 carbon atoms (monomers b) and
   (c) from 0 to 10% by weight of another free-radically copolymerizable monomer containing at least one ethylenically unsaturated group (monomers c),
with the proviso that the total amount of the monomers a) and b) which are polymerized in free-radically polymerized form is at least 90% by weight, with the percentages by weight being based on the total amount of the monomers a)+b)+c) which are polymerized into the polymer; and further comprising, based on the weight of the polymer, from 35 to 55% by weight of at least one hydrate of inorganic salt.

4. A latex foam rubber as claimed in claim 3, wherein the hydrate of an inorganic salt, of which there is at least one, comprises $Al_2O_3 \cdot 3H_2O$ and/or $Al(OH)_3$.

5. A latex foam rubber as claimed in claim 3, wherein the hydrate of an inorganic salt, of which there is at least one, consists of $Al_2O_3 \cdot 3H_2O$ and/or $Al(OH)_3$.

6. A latex foam rubber as claimed in claim 3, which at 1 atm and 23° C. has the following physical properties:

density by mass in accordance with ISO 845: from 80 to 200 kg/m$^3$, elongation at break in accordance with ISO 1798: $\geq 180\%$, tensile strength in accordance with ISO 1798: $\geq 70$ kPa and indentation hardness in accordance with ISO 2439, A: $\leq 350N$.

7. An aqueous latex foam whose latex is an aqueous polymer dispersion whose polymer is in free-radically polymerized form and said polymer is formed of
   (a) at least 50% by weight of at least one monomer selected from the group consisting of butadiene and isoprene (monomers a),
   (b) at least 10% by weight of at least one monomer selected from the group consisting of esters of acrylic acid or methacrylic acid and an alkanol having from 1 to 8 carbon atoms (monomers b) and
   (c) from 0 to 10% by weight of other free-radically copolymerizable monomers containing at least one ethylenically unsaturated group (monomers c),
with the proviso that the total amount of the monomers a) and b) which are polymerized in free-radically polymerized form is at least 90% by weight, with the percentages by weight being based on the total amount of the monomers a)+b)+c) which are polymerized into the polymer.

8. An aqueous latex foam as claimed in claim 7 which, based on the amount of polymer present, contains from 35 to 55% by weight of a hydrate of an inorganic salt.

9. A mattress, cushion or upholstery material comprising a latex foam rubber as claimed in claim 2 or 3.

* * * * *

UNITED STATES PATENT AND TRADEMARK OFFICE
CERTIFICATE OF CORRECTION

PATENT NO. : 5,733,944
DATED : March 31, 1998
INVENTOR(S) : Roelof BALK, et al.

It is certified that error appears in the above-identified patent and that said Letters Patent is hereby corrected as shown below:

On the title page, item [75] should be:

--[75] Inventors: Roelof Balk, Bohl-Iggelheim; Peter Claassen, Ludwigshafen; Onno Graalmann, Dossenheim; Leonardus Aan de Meulen, Dudenhofen, all of Germany; Marinus Visseren, Zenenaar, Holland--

Signed and Sealed this

Twenty-first Day of July, 1998

Attest:

BRUCE LEHMAN

Attesting Officer

Commissioner of Patents and Trademarks